United States Patent [19]

Muschelknautz et al.

[11] Patent Number: 4,539,029
[45] Date of Patent: Sep. 3, 1985

[54] PROCESS AND AN APPARATUS FOR THE DIVISION OF MELTS

[75] Inventors: Edgar Muschelknautz, Leverkusen; Norbert Rink, Dormagen; Georg Chalupka, Odenthal, all of Fed. Rep. of Germany

[73] Assignee: Bayer Aktiengesellschaft, Leverkusen, Fed. Rep. of Germany

[21] Appl. No.: 576,044

[22] Filed: Feb. 1, 1984

[30] Foreign Application Priority Data

Feb. 19, 1983 [DE] Fed. Rep. of Germany ....... 3305809

[51] Int. Cl.$^3$ ............................................. C03B 37/06
[52] U.S. Cl. ............................................. 65/5; 65/16; 264/12; 425/7
[58] Field of Search ................... 65/5, 16; 264/12; 425/7

[56] References Cited

U.S. PATENT DOCUMENTS 4,316,731  2/1982  Lin et al. ................................... 65/5
4,337,074  6/1982  Muschelknautz et al. ................ 65/5

Primary Examiner—Robert Lindsay
Attorney, Agent, or Firm—Sprung Horn Kramer & Woods

[57] ABSTRACT

A drawing nozzle for finely dividing melts according to the nozzle blasting process, wherein (a) the contour of the nozzle inlet from the upper edge of the nozzle passes initially inside a radius $R_1 = 40\%$ of the narrowest cross-sectional dimension d of the drawing nozzle and then runs parallel to, or diverges by up to 2° from the drawing nozzle axis up to a depth below the upper edge of the drawing nozzle which is not greater than the narrowest cross-sectional dimension d of the drawing nozzle;

(b) the nozzle inlet is immediately adjoined by the drawing-out part, the upper cross-sectional dimension of which is from 1.5 to 2.4 times as wide as the narrowest cross-sectional dimension d of the drawing nozzle;

(c) the drawing-out part widens over a length of at least 6 times the narrowest cross-sectional dimension d of the drawing nozzle with a widening angle of from 1° to 2.4° and, (d) in the intermediate cross section between the lower edge of the nozzle inlet and the upper edge of the drawing-out part, there are provided propulsion jet nozzles, the axis of which is inclined by from 5° to −2° to the drawing nozzle.

6 Claims, 19 Drawing Figures

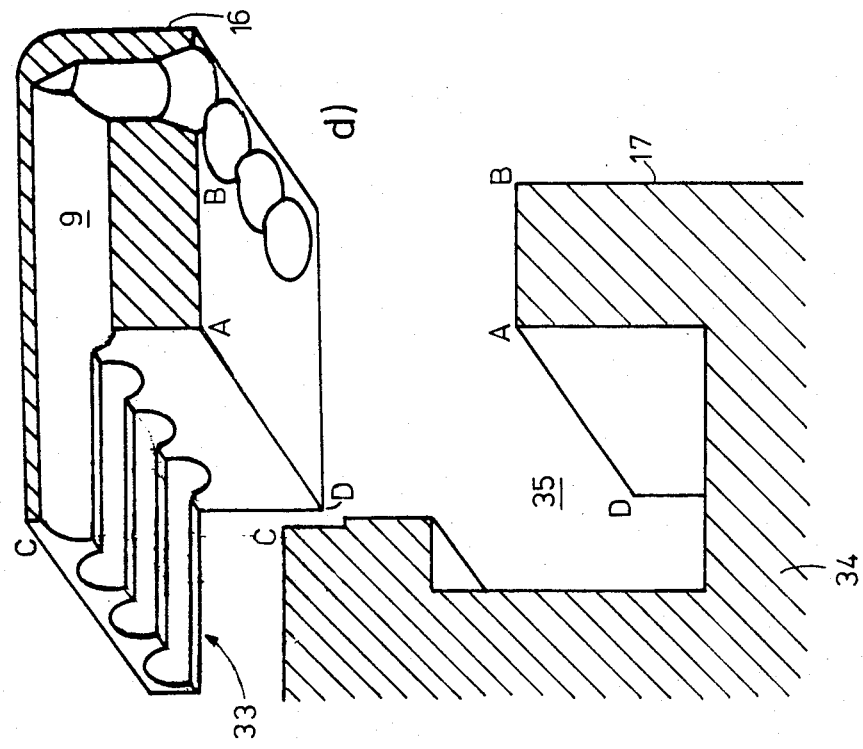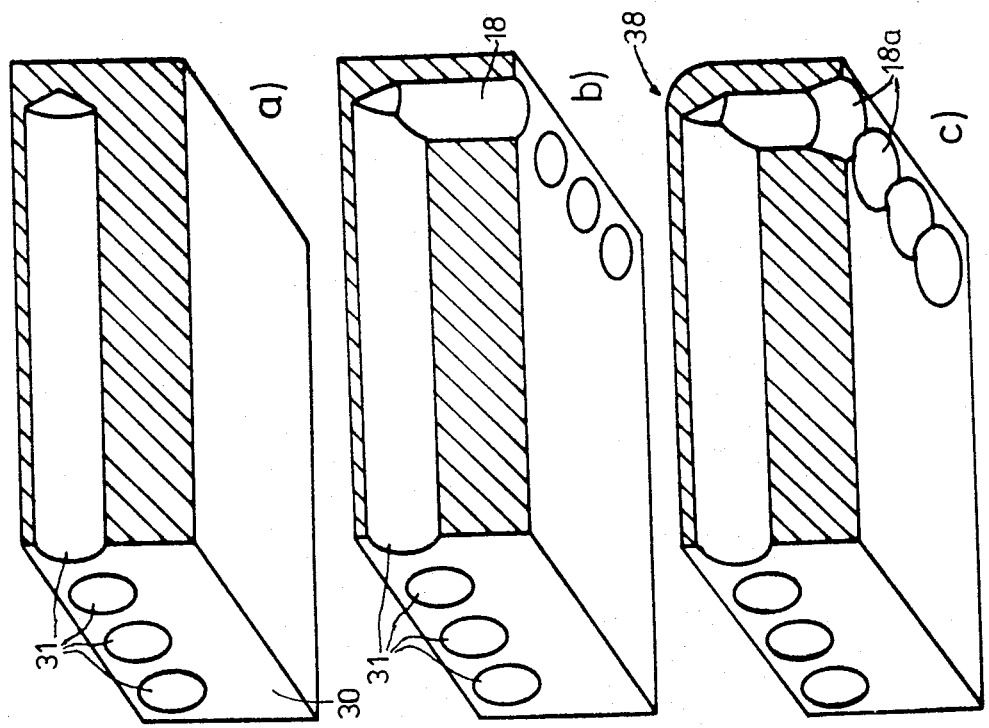
FIG. 12

4,539,029

PROCESS AND AN APPARATUS FOR THE DIVISION OF MELTS

BACKGROUND OF THE INVENTION

This invention relates to a new drawing nozzle for the division of melts according to the nozzle blasting process, and it also relates to a process for the division of melts using the drawing nozzle.

The nozzle blasting process is a very old process for separating mineral melts into fibers. It is distinguished in particular, by its simplicity, there being no mechanically activated parts which come into contact with the hot mineral melt. Nevertheless, the nozzle blasting process has not been able to replace two-stage processes, because the fibers which are obtained by the nozzle blasting process are not long enough and have an unsatisfactory fiber thickness distribution with a relatively large average fiber thickness. Therefore, to obtain longer fibers, processes which comprise a first mechanical fiber formation stage employing centrifugal forces (spinner wheel or spinner basket process), followed by a second aerodynamic drawingout stage, have proved successful.

For the production of thin fibers having a diameter of less than 5μ, industrial two-stage aerodynamic processes are used, the first stage comprising a nozzle blasting process and the second stage comprising a blasting process (Jet-Blast).

It was only the finding disclosed in European Offenlegungsschrift No. 38,989, that a two-stage fiber formation may be carried out in the nozzle blasting process by a specific design of the drawing nozzle, which led to the development of a competitive nozzle blasting process. According thereto, the flow of melt entering the drawing nozzle is split up into a plurality of individual threads (stage one) due to a suitably developed drop in pressure dp/dl in the inlet to the drawing nozzle, and the individual threads are then further drawn out (stage two) in an adjoining drawing-out zone under a substantially constant pressure. Particularly critical parameters of this process include the inlet flow, the transition from the inlet flow to the drawing-out flow and the maintenance of a substantially constant pressure over an adequate length in the drawing-out zone.

In order to take these critical parameters into account, according to the specific solutions proposed in European Offenlegungsschrift No. 38,989, the pressure above the drawing nozzle inlet and the pressure at the end of the drawing-out region are predetermined. When propulsion jet nozzles are preferably used to produce the drop in pressure, these nozzles are positioned below the drawing-out region.

However, it would be desirable for reasons of energy and other reasons, to position the propulsion jets above the drawing-out region. In an arrangement of this type, the propellant gas would also be available as a cooling medium in the inlet region of the drawing nozzle (cooling the upper edge of the nozzle) and in the drawing-out region, and it would also be available as a drawing-out medium, for diluting the fiber/gas dispersion, and for cooling the nozzle wall. This was opposed by the fact that the mixing of the propulsion jets with the air which was drawn into the nozzle inlet by suction, hereinafter termed suction air, constitutes a major disruption to the fiber formation process.

SUMMARY OF THE INVENTION

It has now been found that propellant gas and suction air for the fiber formation process may be mixed with relatively little disruption if the propulsion jets enter the drawing nozzle as close beneath the nozzle inlet as possible and if they enter the drawing nozzle in a substantially parallel direction to the axis of the drawing nozzle (in the case of a circular-symmetrical nozzle) or to the center plane of the drawing nozzle (in the case of a slit-shaped nozzle).

The following description relates, in particular, to the separation of mineral melts into fibers. This invention is not, however, restricted to mineral melts, and also covers the separation of organic and other inorganic materials into fibers and, in particular, also the division of metal melts.

This invention provides a drawing nozzle for the division of melts according to the nozzle blasting process. This drawing nozzle which consists of a nozzle inlet, propulsion jets which enter the drawing nozzle below the nozzle inlet and a slightly diverging drawing-out part, has the following features:

(a) the cross-sectional contour of the nozzle inlet from the upper edge of the nozzle runs initially outside a radius $R_2 = 40\%$ of the narrowest cross-sectional dimension d of the drawing nozzle and then parallel to, or diverging by up to 2° from the axis of the drawing nozzle up to a depth below the upper edge of the drawing nozzle which is not greater than the narrowest crosssectional dimension d of the drawing nozzle;

(b) the nozzle inlet is immediately adjoined by the drawing-out part, the upper cross-sectional dimension of which is from 1.5 to 2.4 times as wide as the narrowest cross-sectional dimension d of the nozzle inlet;

(c) the drawing-out part widens over a length of at least 6 times the narrowest cross-sectional dimension d of the drawing nozzle at a widening angle of from 1° to 2.4°; and (d) in the intermediate cross-section between the lower edge of the nozzle inlet and the upper edge of the drawing-out part, propulsion jet nozzles are provided, the axis of which is inclined by from $+5°$ to $-2°$ to the axis of the drawing nozzle.

The lower edge of the nozzle inlet and the upper edge of the drawing-out part lie in a plane perpendicular to the axis or center plane of the drawing nozzle.

The process according to the present invention for the production of mineral wool fibers comprises selecting the propulsion jet speed such that a pressure of from 0.2 to 0.4 of the ambient pressure upstream of the inlet to the drawing nozzle prevails in the drawing-out part. The speed of the propulsion jets at their entry into the drawing-out part of the drawing nozzle should preferably be from 1.5 to 2.5 times sonic speed, and the mass flow of the gas which is introduced as a propellant is to be generally calculated such that it amounts to from 3 to 1.5 times the suction air mass flow which enters the nozzle inlet. The throughput quantity (mass flow) of the suction air entering the drawing nozzle is a magnitude which is relatively well defined by the inlet cross-section, since it is established on the basis of the critical pressure which is adjusted at the narrowest cross section of the drawing nozzle inlet and which amounts to about 0.5 times the ambient pressure above the inlet. A supersonic speed of at least 1.5 times sonic speed prevails in the drawing-out region of the nozzle.

Propulsion jets and suction air should preferably mix under a constant, mutually equivalent pressure. Consequently, the suction air should have the same pressure at the end of the nozzle inlet as the propulsion jets at the propulsion jet outlet. The nozzle inlet itself is therefore preferably designed as a Laval nozzle having a converging part in which the pressure falls to the critical pressure, and then having a diverging part in which the pressure continues to drop to the pressure which is provided in the drawing-out part of the nozzle.

In this case as well, the nozzle inlet also still acts as a Laval nozzle if the part adjoining the converging nozzle inlet part has a constant cross-section, i.e. if the contour runs parallel to the drawing nozzle axis. The inlet flow is then detached from the inlet contour which causes a narrower, narrowest flow cross-section, with which the critical pressure is adjusted, than the actual cross-section of the nozzle contour. The flow then widens again from this narrowest flow cross-section to the nozzle cross-section at the end of the nozzle inlet. Thus, a Laval flow "without a wall" is produced. The propulsion jets nozzles are preferably also designed as Laval nozzles, so that the pressure which is already inside the nozzle falls to the pressure which is desired in the drawing-out part.

The pressure gradient in the drawing nozzle inlet upstream of the narrowest cross-sectional dimension d is produced by the design of the drawing nozzle inlet. The pressure gradient should lie above $\Delta p \cdot d / \Delta l = 1.2$ bar.

If the contour of the drawing nozzle inlet runs from the upper edge of the drawing nozzle onwards between the radii $R_1 = 40\%$ and $R_2 = 25\%$ of the narrowest cross-sectional dimension d, pressure gradients $\Delta p \cdot d / \Delta l$ of from 1.2 to 2 bars are obtained. When $d = 4$ mm, the pressure gradient $\Delta p / \Delta l$ may range from 0.3 to 0.5 bars per mm.

However, it is also possible to produce the pressure gradient which is required by blowing streams of gas (cross streams) in the drawing nozzle inlet into the inlet flow in a direction which is substantially transverse to the direction of the inlet flow which would develop without the gas streams. Consequently, depending on the speed of the cross jets and on the intensity thereof (i.e. of the cross stream mass flow which is blown in, in proportion to the suction air mass flow), it is possible to obtain relative pressure gradients $\Delta p \cdot d / \Delta l$ of from 1.2 to 4 bars. The streams of gas are preferably blown in just above the point where the critical pressure develops. On the one hand, the gas streams cause a narrowing of the inlet cross section and they also provide additional masses of gas to be accelerated. The mass flow of the gas which is blown in as "cross streams" should preferably amount to from 2 to 40% of the suction air flow, and more preferably from 5 to 20% of the suction air flow. The speed thereof is preferably from 1 to 3 times sonic speed.

The preferred inlet contour is more preferably combined with the charge of cross streams, and preferred pressure gradients $\Delta p \cdot d / \Delta l$ of from 2.4 to 4 bars are obtained. In the case of a drawing nozzle in which $d = 4$ mm, this implies a pressure drop of from 0.3 to 0.5 bars over a length of 0.5 mm.

It is particularly advantageous for the fiber formation, if the edge of the nozzle structure at which the inlet flow and the propulsion jets contact each other are designed with sharp edges, so that suction air and propellant gas may be guided up until they meet. However, in this case the expense in terms of production of the nozzle must be weighed up against the acceptance of minor disruptions when the propulsion jets and the suction air are mixed together. The propulsion jets are more preferably designed as a plurality of individual bores which are positioned substantially parallel to the center plane of a slitshaped drawing nozzle or are positioned on a radius around the axis of a circular drawing nozzle. In this case, the propulsion jet nozzles are more preferably to be designed so closely adjacent one another that the outlet cross-sections of the divergent part overlap.

Since the ideal case of a nozzle structure which is designed to have sharp edges between the suction air flow and the propulsion jets can only be realized technically with very great difficulty, when the process is carried out and/or the nozzle is constructed, a re-expansion of the suction air flow and the propulsion jet in the "flow cavity" which is produced in the intermediate cross-sectional plane between the suction air flow and the propulsion jet is to be considered. Due to the re-expansion, the pressure of the propulsion jets and of the suction air decreases further below the intermediate cross-section. The requirement of an equal pressure for the propulsion jet and for the suction air flow is to be met for the region after re-expansion has taken place. The connection between cross-sectional, pressure, temperature and speed changes of gas streams is known from general fluid mechanics. In the case of division nozzles for melts according to the present invention, the influence of the melt on the gas flow must be considered. This is appropriately carried out based on preliminary experiments, since it is virtually no longer possible to determine theoretically the parameters for the gas flows.

The length of the inlet part from the upper edge of the drawing nozzle up to the plane of the intermediate crosssection should be as short as possible. The minimum length of the inlet part is determined by the necessity of the propellant gas supply and by the design of the propulsion jet nozzles.

Therefore, it is virtually impossible to fall below a length of the inlet part of 0.2 d (d = narrowest cross-sectional dimension of the drawing nozzle) for reasons of construction. The length of the inlet part should preferably be below 0.8 d, and, more preferably, from 0.5 to 0.8 d.

The requirement of as short a drawing nozzle inlet as possible, requires a very narrow cross section for the propulsion jet supply line which is unfavorable per se in terms of flow, as well as an equal unfavorable sharp-edged, generally right-angled deflection of the flow from the propulsion jet supply line to the propulsion jet nozzle. Furthermore, the stringent requirement of propulsion jet pressure and speed requires a high level of dimensional accuracy of the inlet part of the drawing nozzle. This high level of dimensional accuracy cannot be ensured by slit-shaped propulsion jet nozzles, which were conventionally used in similar prior art constructions. Therefore, the propulsion jet nozzles are designed as a plurality of closely adjacent individual bores which are supplied substantially at a right angle thereto by propellant gas supply lines which also consist of individual bores. The ridges which remain between the individual bores ensure the dimensional accuracy of the inlet part which is required.

The pressure course in the drawing-out part of the drawing nozzle is substantially determined by the widening angle of the drawing-out part. This also depends on the quantity of melt which enters the drawing nozzle, on the viscosity and temperature thereof, and above all on the fiber-separation properties of the mineral melt which is to be separated into fibers. The appropriate widening angle for the production of a constant pressure inside the drawing-out part is therefore appropriately determined in an experimental nozzle.

The length of the drawing-out part in which a constant pressure must be maintained should preferably amount to from 8 to 20 times the narrowest cross-sectional dimension d of the drawing nozzle.

The drawing nozzle preferably contains at the end of the drawing-out part, a bore which is transverse to the axis or central plane of the nozzle and which allows the static pressure to be measured in the nozzle during operation. In this event, changes in pressure during operation which are caused, for example, by a maladjustment of the melting pot positioned above the drawing nozzle may be established periodically or continuously during operation by measuring the pressure. It is then possible to reproduce the preselected desired pressure by changing the propulsion jet speed, the spacing between the melting pot and the drawing nozzle, or the widening angle in the drawing-out part of the drawing nozzle. For example, if the spacing between the melting pot and the drawing nozzle was increased, less melt would enter the nozzle and consequently the pressure at the end of the drawing-out part of the nozzle would be reduced. Increasing the speed of the propulsion jets also counteracts an increase in pressure at the end of the drawing nozzle. An enlargement of the widening angle of the drawing nozzle also results in a reduction in pressure.

The continuous or periodic pressure measurement at the end of the drawing-out part of the drawing nozzle during operation with a suitable regulation of the pressure to the predetermined desired value ensures a regular separation into fibers during long periods of operation.

Another problem which may arise in elongate slit-shaped drawing nozzles is that longitudinal instabilities may occur due to gas flows in the direction of the drawing nozzle slit. Therefore, in the case of slit-shaped nozzles, the narrowest cross-sectional surface should have a side ratio of at the most 1:10, preferably from 1:5 to 1:8. Drawing nozzles which have longer slits are therefore preferably produced from elements, the extent of which in the direction of the slit amounts to at the most 10 times the narrowest cross-sectional dimension d, the individual elements being sealed with respect to one another. Each of the elements is more preferably designed to be individually adjustable with respect to the spacing from the melting pot and/or the widening angle of the drawing-out part and/or the propulsion jet supply of compressed gas. The pressure is then measured in each element independently of one another at the end of the drawing-out part to regulate the operational conditions.

Further details of the present invention will now be described with reference to the following Figures.

BRIEF DESCRIPTION OF THE DRAWINGS

FIG. 1a shows on the left-hand side a schematic view of the combination of a melting pot 1 and a drawing nozzle 2. The pot 1 contains a mineral melt 3. On its lower edge, the pot has an electrically heated melt outlet part 4 with melt outlet nipples 5. The drawing nozzle 2 consists of an inlet part 6 and a drawing-out part 7. Propulsion jets 8 enter the drawing-out part 7 at the transition from the inlet part 6 to the drawing-out part 7. The propulsion jets 8 are supplied by compressed gas chambers 9. The supply lines to the compressed gas chambers 9 are not shown. Ambient gas is drawn in by suction from above the drawing nozzle inlet due to the suction effect of the propulsion jets 8. An inlet flow 10 is formed. A flow of melt 11 issuing from the nipple 5 on the lower edge of the melting pot 1 is accelerated by the suction effect of the inlet flow 10, and it contracts. Due to the drop in pressure in the nozzle inlet, the melt flow 11 splits up approximately at point Z into a plurality of individual secondary threads 12. The structal features of the nozzle inlet will be described later on with reference to the enlarged sectional view of FIG. 2. Furthermore, the drawing shows a bore 13 which runs transversely to the center plane of the drawing nozzle and serves in pressure measurement by means of a pressure measuring device 14.

Figures 1A, 1B:
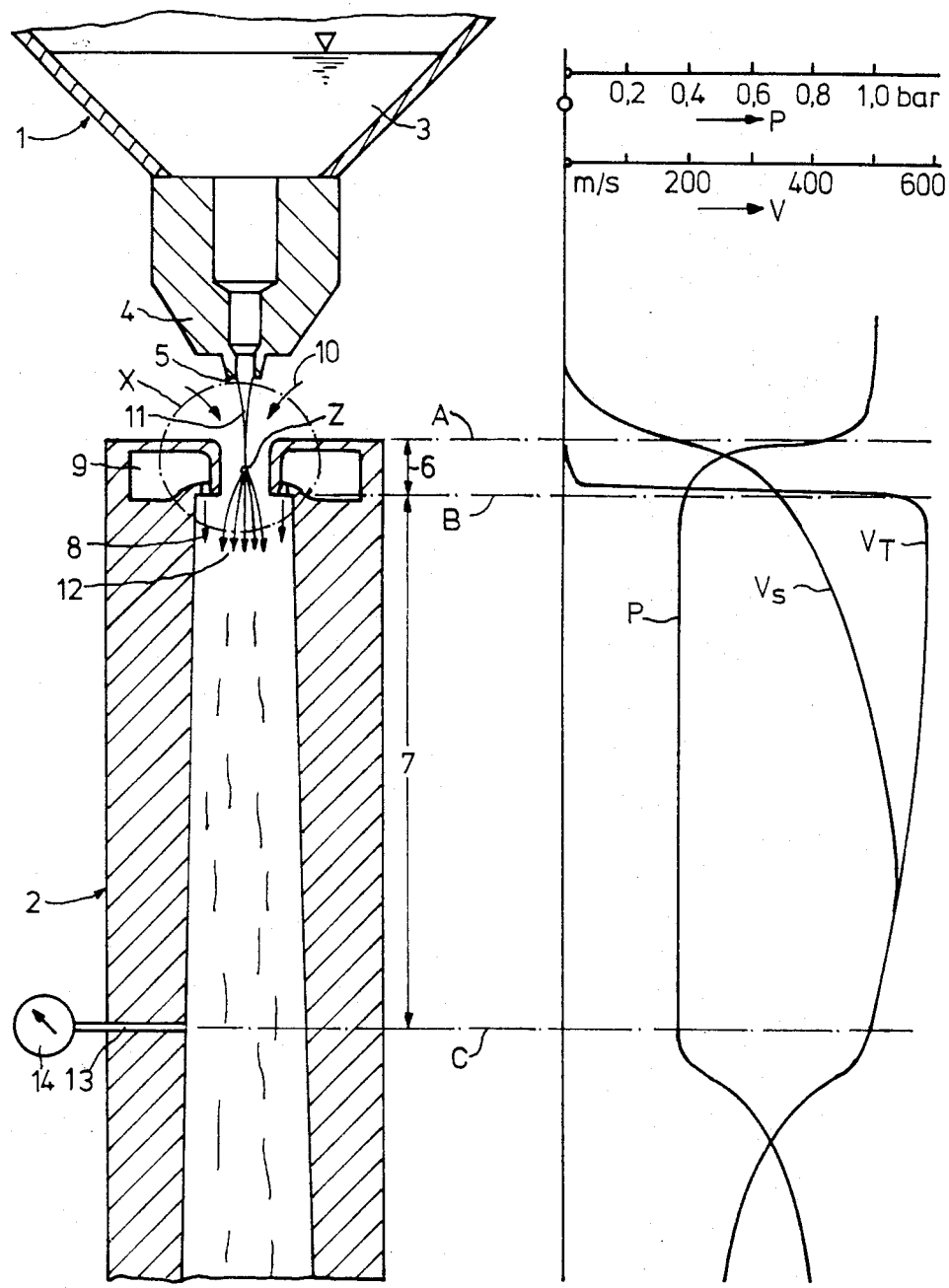
FIGS. 1a and b are a schematic view of the drawing nozzle according to the present invention and the pressure and speed courses inside the drawing nozzle.

The right-hand side, of FIG. 1b, shows the pressure and speed conditions inside the drawing nozzle. In this Figure, p denotes the pressure in the drawing nozzle. The critical planes such as the nozzle upper edge A, the end of the drawing nozzle inlet B (intermediate cross-sectional plane) and the end of the drawing-out part C have each been transferred to the pressure and speed diagram. The diagram shows that the gas pressure above the drawing nozzle inlet falls slowly at first and then exhibits the greatest pressure gradient approximately upon passing through the plane level with the drawing nozzle upper edge, and then passes over to the desired constant pressure level inside the drawing-out part. Thereafter, the pressure rises abruptly, the transition to the subsonic flow through impact.

The curve $V_s$ describes the speed of the suction air. Just downstream of the nozzle upper edge plane A, the curve reaches sonic speed, and while mixing with the propulsion jets, gradually rises to 1.7 times sonic speed.

The third curve $V_T$ shown describes the speed of the propellant gas. This gas issues from the propellant jet nozzle at about twice sonic speed, and then gradually loses speed as it mixes with the suction air. Once the propellant gas and suction air have mixed together, i.e. have attained the same speed, the further loss of speed is caused by the release of kinetic energy to the fibers for them to be drawn out and further accelerated. The following Table gives typical data for the fibers which are produced, in the different phases of the fiber formation process. In the Table, D denotes the diameter of the fibers, $V_F$ denotes the speed of the fibers and N denotes the number of fibers which emerge from one nipple of the melting pot:

TABLE

|  | D μm | $V_F$ m/s | N No. |
| --- | --- | --- | --- |
| Nipple | 1500 | ~0 | 1 |
| Plane A | 290 | 1.5 | 1 |
| Plane B | 35 | 2.5 | 40 |
| Plane C | 4 | 200 | 40 |

Figure 2:
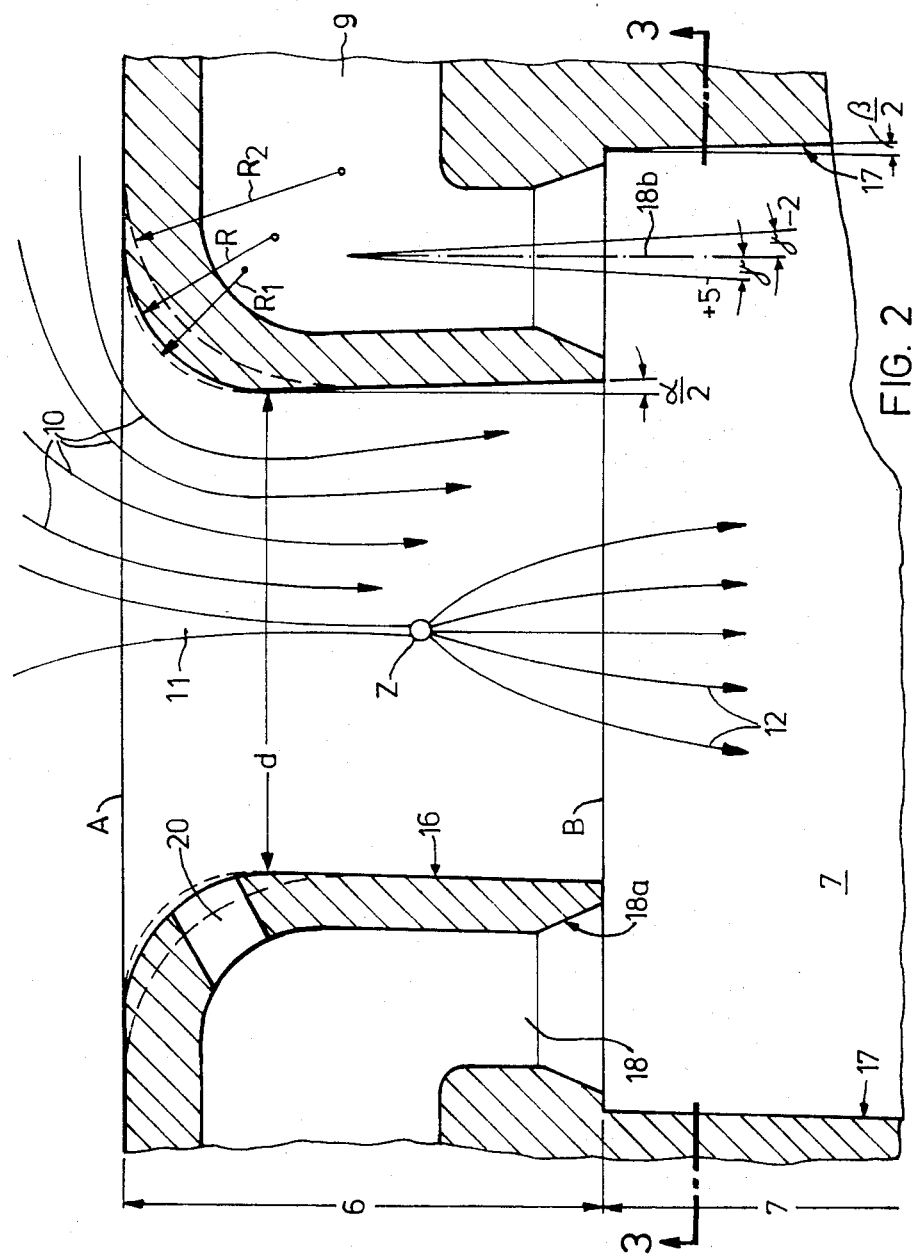
FIG. 2 shows an enlarged view of the drawing nozzle inlet (detail X from FIG. 1)

FIG. 2 shows an enlarged section X taken from FIG. 1. This Figure shows a cross-section through a slit-shaped or circular-symmetrical drawing nozzle of this invention. Starting from the plane A, the inlet contour 16 of the drawing nozzle is initially defined by the converging part having a radius R which should lie between the radii $R_1 = 25\%$ and $R_2 = 40\%$ of the narrowest cross-section of the drawing nozzle which is denoted by d in the Figure. The continued course of the contour 16 diverges slightly, the contour being inclined to a parallel line to the axis or central plane of the drawing nozzle by up to an angle of $OC/2 = 1°$.

In the plane B, the cross section of the drawing nozzle widens until it reaches the drawing-out part. The boundary wall 17 of the drawing out part is inclined by an angle $\beta/2$ of from 0.5° to 1.2° with respect to a parallel line to the axis or centre plane of the drawing nozzle.

Furthermore in plane B, the propulsion jet nozzles 18 discharge into the drawing-out part 7. The propulsion jet nozzle axis 18b is shown to be parallel to the drawing nozzle axis. It may be inclined by an angle γ of from +5° to −2° with respect to the axis or central plane of the drawing nozzle. A stream of melt 11 is also shown which splits up into a plurality of secondary threads 12 at the point Z where separation into fibers takes place. Reference numeral 10 denotes the flow lines of the inlet flow.

The Figure also shows cross stream nozzles 20 from which streams of gas issue which are to increase the drop in pressure in the nozzle inlet and which are supplied by the compressed gas chamber 9.

Figure 3:
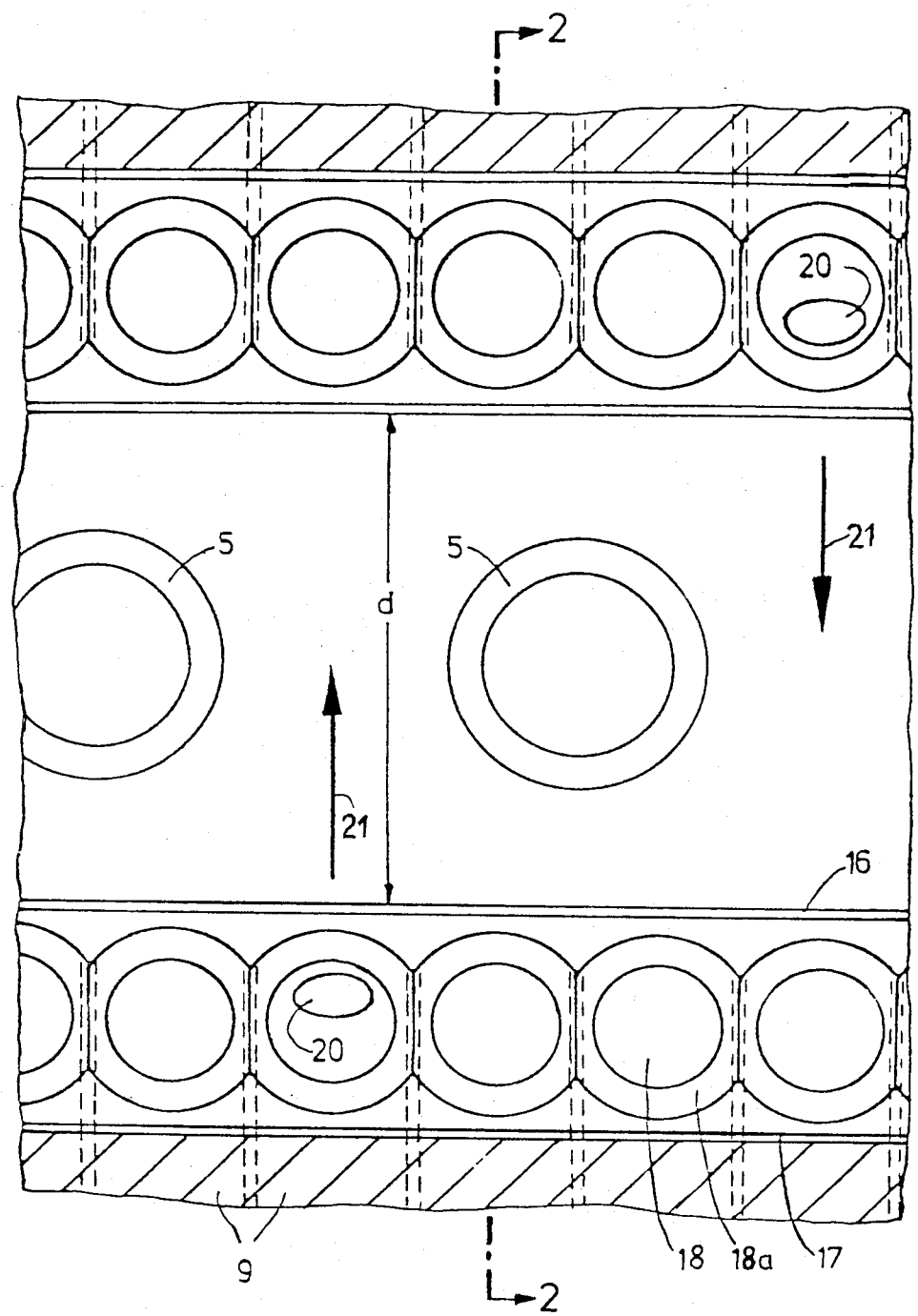
FIG. 3 shows a section 3—3 of the view according to FIG. 2.

FIG. 3 shows a section along line 3—3 in FIG. 2, showing the outlets of the propulsion jets 18 from below. This Figure shows in section, an embodiment of a slit-shaped drawing nozzle. According to a particularly preferred embodiment of the present invention, the propulsion jet nozzles 18 are positioned so closely together that diverging parts 18a of the propulsion jet nozzles overlap. Moreover, the numbers in the Figure denote elements similar to those in FIG. 2. The melt outlet openings (nipples) 5 are also shown. The arrows 21 denote "cross streams", and reference numeral 20 denotes the cross stream nozzles. Furthermore, the propulsion jet supply lines 9 are indicated by concealed lines.

Figure 4:
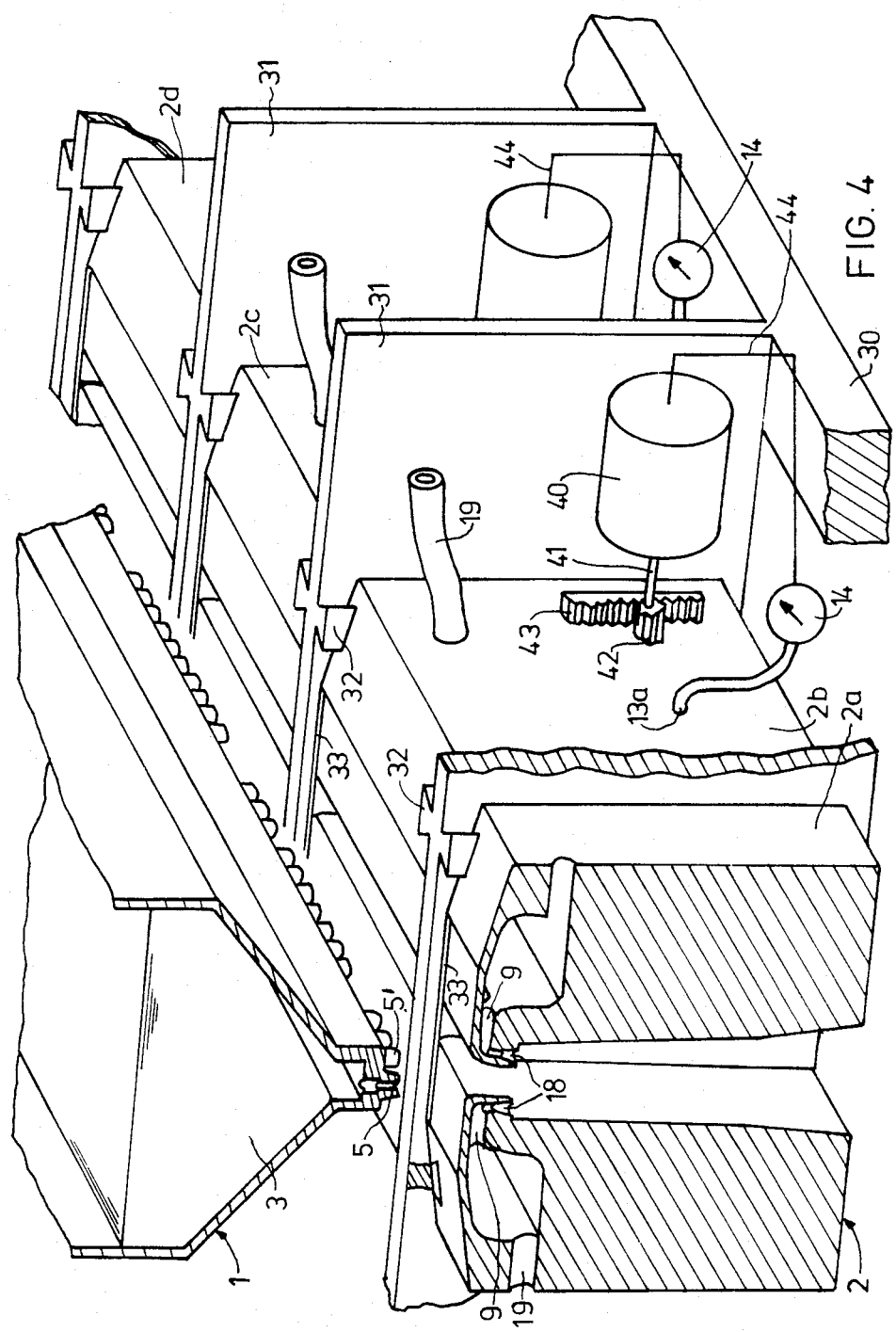
FIG. 4 shows a perspective view of vertically-adjustable drawing nozzle segments with automatic regulation of the pressure in the drawing-out part of the drawing nozzle.

FIG. 4 shows an embodiment which is preferred according to the present invention of the drawing nozzle in segment construction. The individual segments may be adjusted in height separately from one another. The drawing nozzles are positioned on a support 30 which bears a plurality of carrier plates 31 which are attached in a vertical position on this support 30. Drawing nozzle segments 2a, 2b, 2c and 2d are shown between the carrier plates 31. These segments may be moved vertically separately from one another by means of dovetail guides 32. For the vertical displacement, electric motors 40 are secured to the carrier plates 31, and act on toothed racks 43 connected to the respective drawing nozzle segment, by means of a shaft 41 and toothed wheels 42.

The pressure in the drawing-out part 7 of the drawing nozzle is measured by a bore (not shown) which opens into the drawing-out part vertically to the central plane of the drawing nozzle, and by means of a pressure line 13a to a pressure measuring device 14. In a particularly preferred mode of operation, the pressure measuring device 14 simultaneously compares the actual pressure with a predetermined desired pressure and controls the motor 40 via a line 44 to regulate the pressure in the drawing-out part 7. Furthermore, each drawing nozzle segment has a separate compressed gas supply line 19 for the pressure chamber 9 to supply the propulsion jet nozzles 18. The individual drawing nozzle segments are sealed in a gas-tight manner by seal plates 33. A melting pot 1 containing a melt 3 is shown above the drawing nozzle. The pot which is shown in this Figure has a double row of melt outlet openings 5 and 5' which are staggered with respect to each other.

Figure 5:
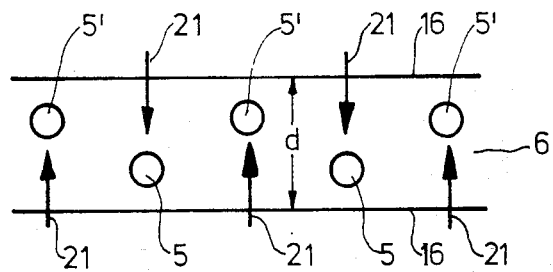
FIGS. 5, 6 and 7 show arrangements for "cross streams"
Figure 6:
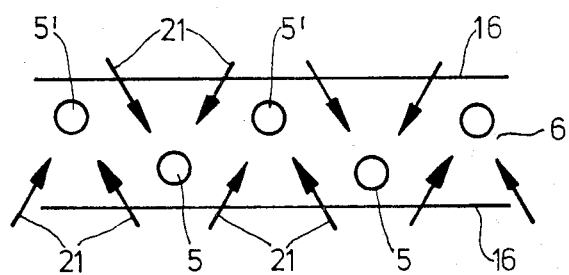
Figure 7:
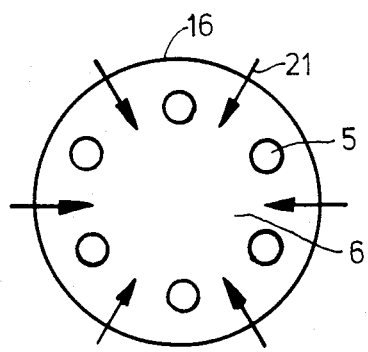

FIGS. 5, 6 and 7 show preferred arrangements of cross streams. Each Figure schematically shows a top view of the drawing nozzle inlet 6. The horizontal sectional line through the drawing nozzle at the narrowest cross section d is denoted by reference numeral 16. The melt outlet openings 5 of the melting pot project into the drawing nozzle inlet 6. This is an arrangement which is analogous to FIG. 4 having a double row 5 and 5' of melt outlet openings. The cross stream nozzle 20 shown in FIG. 2 is not shown in these Figures, but the arrows 21 indicate the cross streams. FIG. 7 shows an analogous view of a circular-symmetrical drawing nozzle, in which streams of melt enter the drawing nozzle through melt outlet openings 5 from the melting pot positioned above the nozzle.

FIGS. 11a–11d illustrate a production process for the inlet part of the drawing nozzle according to the present invention. A sheet 30 which is, for example, 2 mm thick is used as the starting material for the inlet part (FIG. 11a), whose length perpendicular to the plane of the drawing corresponds to one drawing nozzle segment for example, a length of 25 mm. Thirteen parallel bores 31 which have the desired propulsion jet diameter of, for example 1.1 mm, are made in this sheet, each at a spacing of 1.8 mm from the other. The sheet is then bent round, substantially at a right angle (FIGS. 11b and 11c) so that the inlet contour 38 is produced. While the sheet is being bent round, the bores 31 may be filled with, for example, fine sand, optionally with an organic binder. After bending, the bores 31 may be drilled with the propulsion jet nozzle diameter, for example, to a depth of 1.6 mm, (reference numeral 32), to form propulsion jet supply lines. The sheet is then machined, and the widening part 18a of the propulsion jet nozzle 18 is formed. In so doing, the widening part 18a receives an outlet radius of 1.9 mm, so that the individual outlet parts of the propulsion jet nozzles overlap. Furthermore, the region 33 is removed so that half of the propulsion jet supply lines 9 are cut out in this region. The inlet part is then welded onto the part 34 which is shown beneath and which contains the drawing-out part 17 and propulsion jet pressure chambers 35. The propulsion air exits from the part 34, as shown by the arrows, into the propulsion jet supply line 9.

FIG. 12 shows another possibility of producing the inlet part of the drawing nozzle. A sheet 30 is again used, the thickness of which corresponds to the desired length of the inlet part, for example, 2.5 mm. Bores 31 having a propulsion jet supply line diameter of 1.6 mm are made at a spacing of 1.0 mm from the upper edge of the sheet (FIG. 12a). The bores 31 have a spacing of 1.8 mm. Thereafter, (FIG. 12b), the propulsion jet bores 18 are formed having a diameter of 1.1 mm. The widening part 18a receives an outlet diameter of 1.9 mm. The inlet contour 38 is also shown (FIG. 12c). According to FIG. 12d, once the region 33 has been removed, the inlet part is welded onto the structure 34, and in each case the corners of the inlet part which are denoted by capital letters come into contact with correspondingly denoted corners of the part 34.

PRACTICAL EXAMPLE 1

An apparatus according to the present invention according to FIG. 4 was used. The dimensions were as follows:
narrowest cross-section in the drawing nozzle inlet d=4 mm,
radius of the converging part R=1.8 mm,
diameter of the propulsion jet nozzles=1 mm,
diameter at the outlet of the propulsion jet nozzles=1.5 mm,
width at the beginning of the drawing-out part=8 mm,
flaring angle of the drawing-out part=1.5°,
air pressure in the propellant gas chamber 9=6 bars,
gas pressure in the drawing-out part of the drawing nozzle=0.35 bars,
length of the drawing-out part=60 mm,
length of the drawing nozzle inlet=3 mm,
diameter of the melt outlet openings=1.6 mm,
length of one drawing nozzle segment=25 mm,
number of nozzle nipples which discharge into one segment: 15 in a double row,
number of segments: 16.

A subsonic diffuser is also provided below the drawing-out part of the drawing nozzle in order to reduce the speed of the fiber/air mixtures issuing from the drawing-out part of the drawing nozzle.

Figure 8:
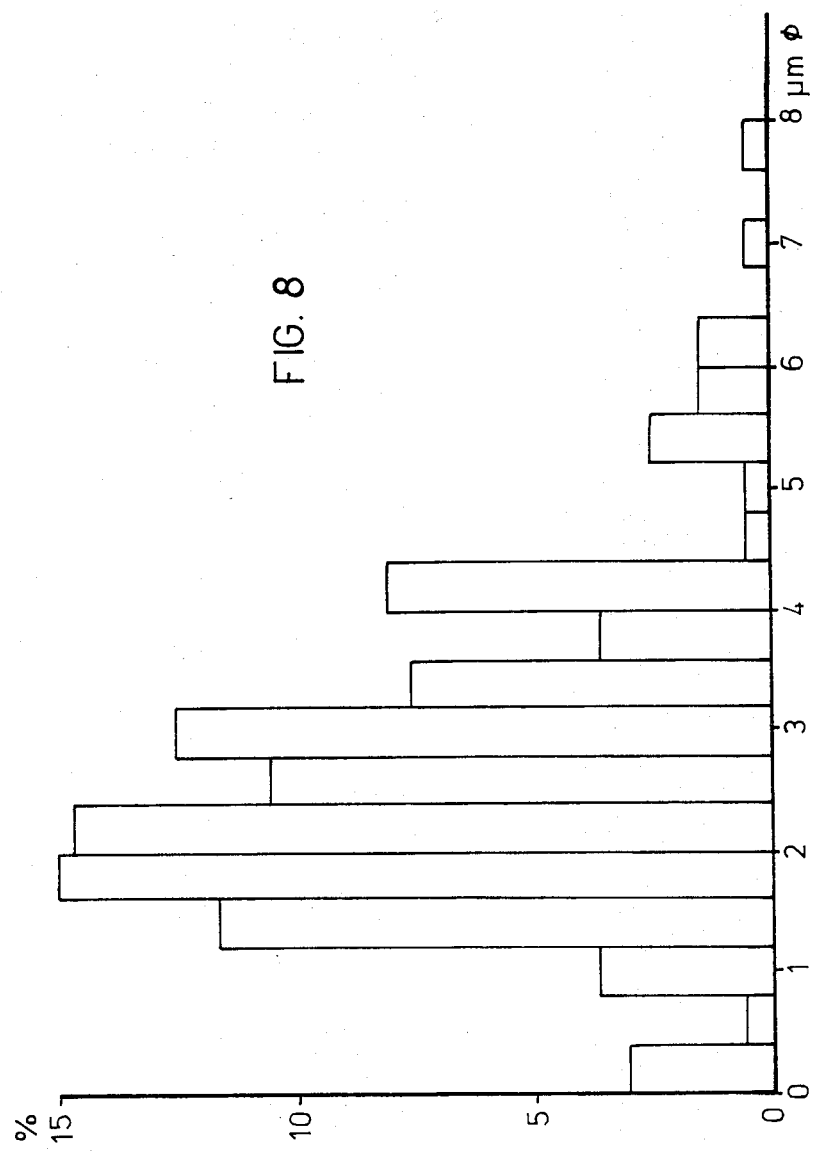
FIGS. 8, 9 and 10 show fiber thickness distributions obtained according to the present invention for different mineral melts, and FIGS. 11a, b, c and d and 12a, b, c and d show production processes for the inlet part of the drawing nozzle.

A diabase melt was introduced into the pot and it issued from each melt outlet opening at a rate of 5 cm/s. Fibers were obtained having a length of from 10 to 30 mm, an average diameter of 3.8μ and a standard deviation in the fibers thickness of 1.97. The fiber diameter distribution is shown in FIG. 8. The resulting fibers also contained 25.8% by weight of beads having a diameter of more than 50μ.

The bead content was determined in a conventional manner in that the fibers were initially heated to a temperature of from 500° to 600° C. in order to render them brittle, and they were then ground on a sieve having a mesh width of 50μ in the presence of rubber cubes. The sieving residue indicated the bead content.

PRACTICAL EXAMPLE 2

Figure 9:
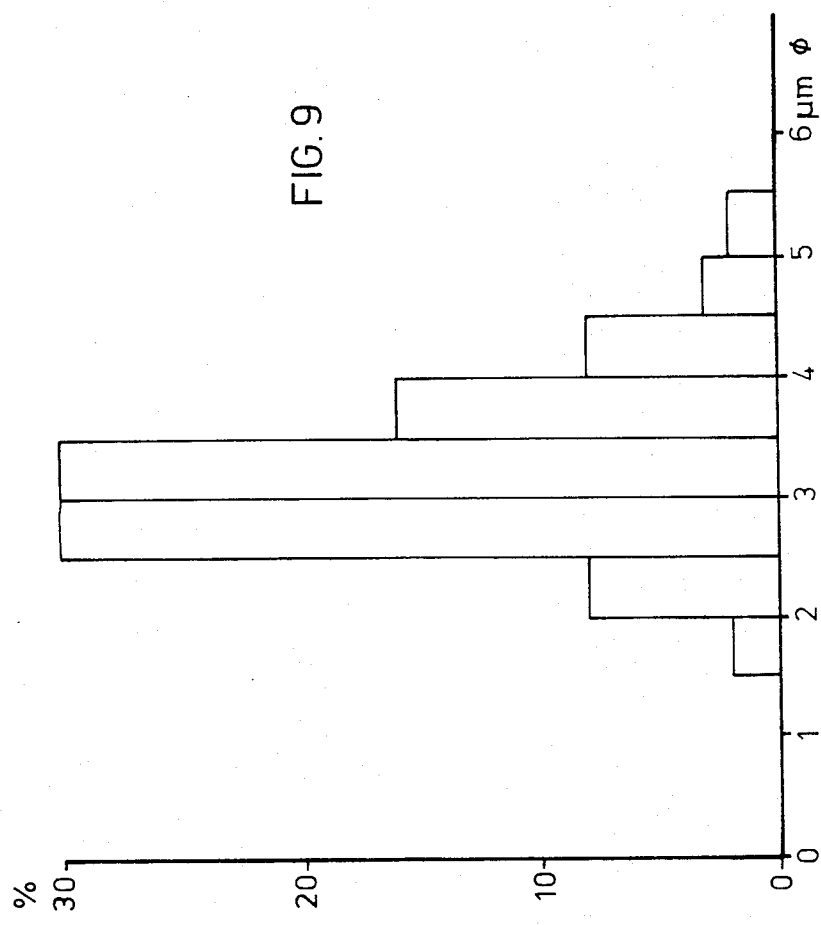

The same apparatus as in Example 1 was used. C-glass was introduced into the pot. The conditions for separating into fibers were the same as in Example 1. The only difference was that the drawing nozzle had to be moved nearer to the pot in order to ensure the pressure in the drawing-out part. Fibers having a length of from 5 to 15 mm were obtained. The fiber diameter distribution is shown in FIG. 9. The content of thick pieces of fiber was determined in the manner conventional for glass fibers by suspending the fibers in water and then crushing them. The thick fiber fragments which were deposited were dried and weighed. This produced a thick fiber content of 20% by weight.

PRACTICAL EXAMPLE 3

Figure 10:
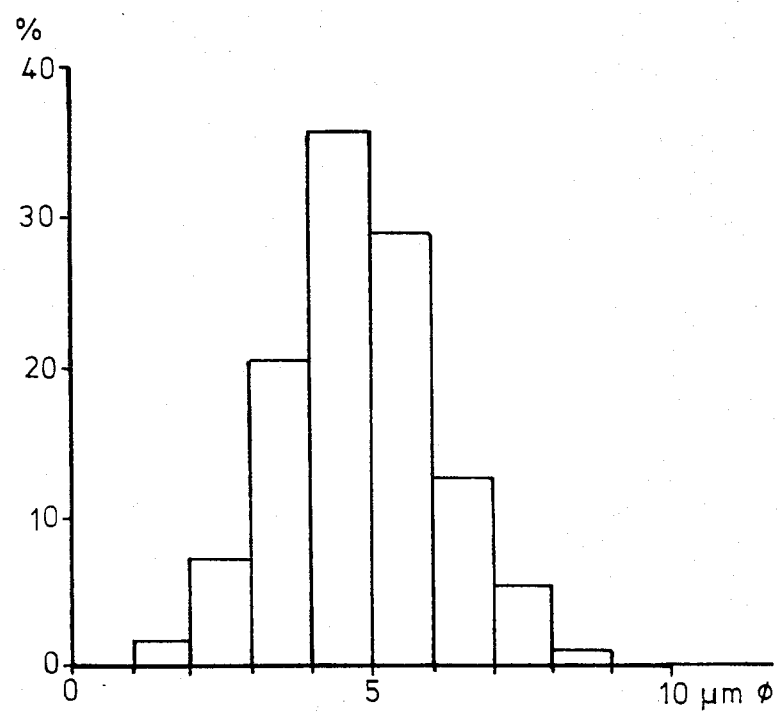
Figure 11:
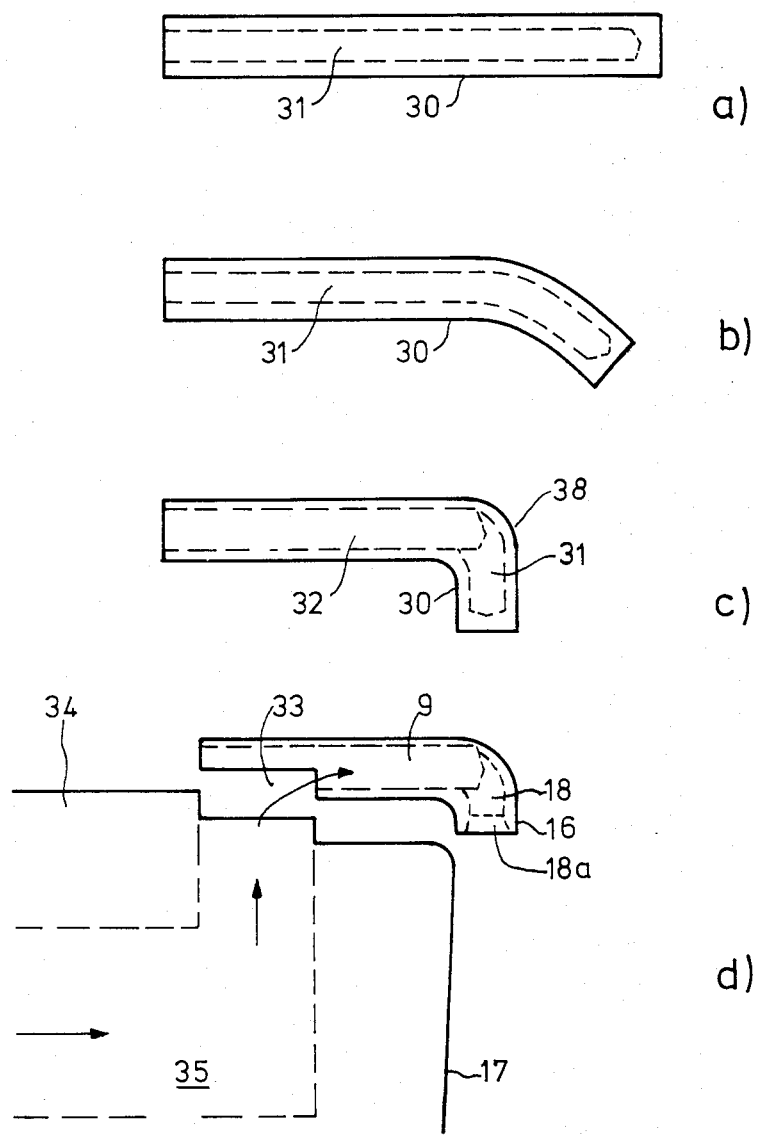

E-glass was separated into fibers in the same manner as in Example 2. The resulting fiber thickness distribution is shown in FIG. 10. The amount of parts thicker than 15μ was 7%.

Standard deviation as mentioned herein is calculated according to the following formula:

$$S = \sqrt{\frac{1}{N-1} \sum_{i=1}^{N} (x_i - \bar{x})^2}$$

It will be appreciated that the instant specification and examples are set forth by way of illustration and not limitation, and that various modifications and changes my be made without departing from the spirit and scope of the present invention.

We claim:

1. A drawing nozzle for the division of melts according to the nozzle blasting process, the nozzle comprising a nozzle inlet, propulsion jets entering the drawing nozzle below the nozzle inlet and a slightly divergent drawing-out part, and wherein:
   (a) the contour of the nozzle inlet from the upper edge of the nozzle passes initially inside a radius $R_1 = 40\%$ of the narrowest cross-sectional dimension d of the drawing nozzle and then runs parallel to, or diverges by up to 2° from the drawing nozzle axis up to a depth below the upper edge of the drawing nozzle which is not greater than the narrowest cross-sectional dimension d of the drawing nozzle;
   (b) the nozzle inlet is immediately adjoined by the drawing-out part, the upper cross-sectional dimension of which is from 1.5 to 2.4 times as wide as the narrowest cross-sectional dimension d of the drawing nozzle;
   (c) the drawing-out part widens over a length of at least 6 times the narrowest cross-sectional dimension d of the drawing nozzle with a widening angle of from 1° to 2.4° and,
   (d) in the intermediate cross section between the lower edge of the nozzle inlet and the upper edge of the drawing-out part, there are provided propulsion jet nozzles, the axis of which is inclined by from 5° to −2° to the drawing nozzle.

2. A drawing nozzle according to claim 1, wherein the propulsion jet nozzles are designed as Laval nozzles.

3. A drawing nozzle according to one of claims 1 or 2, wherein the drawing nozzle is designed in the shape of a slit and, in the direction of the slit-shaped extent consists of segments which are sealed with respect to each other and the width of which in the direction of the slit-shaped extent is not greater than 10 times the narrowest cross-sectional dimension d.

4. A drawing nozzle according to claim 1, further comprising gas nozzles are provided in the converging part of the drawing nozzle inlet, the principal direction component of the axis of the nozzles being directed perpendicularly to the central plane of the drawing nozzle.

5. A drawing nozzle according to claim 3, wherein means are provided to adjust the height of the segments with respect to one another.

6. A process for the manufacture of mineral fibers by use of the nozzle, wherein
   (a) the contour of the nozzle inlet from the upper edge of the nozzle passes initially inside a radius $R_1 = 40\%$ of the narrowest cross-sectional dimension d of the drawing nozzle and then runs parallel to, or diverges by up to 2° from the drawing nozzle axis up to a depth below the upper edge of the drawing nozzle which is not greater than the narrowest cross-sectional dimension d of the drawing nozzle;
   (b) the nozzle inlet is immediately adjoined by the drawing-out part, the upper cross-sectional dimension of which is from 1.5 to 2.4 times as wide as the narrowest cross-sectional dimension d of the drawing nozzle;
   (c) the drawing-out part widens over a length of at least 6 times the narrowest cross-sectional dimension d of the drawing nozzle with a widening angle of from 1° to 2.4° and,
   (d) in the intermediate cross section between the lower edge of the nozzle inlet and the upper edge of the drawing-out part, there are provided propulsion jet nozzles, the axis of which is inclined by from 5° to −2° to the drawing nozzle, wherein a desired pressure of from 0.25 to 0.4 of the ambient pressure upstream of the inlet of the drawing nozzle is predetermined in the lower third of the drawing-out part, the pressure is measured at least periodically and, if the pressure which has been measured deviates from the desired pressure, suitable parameters are changed such that the desired pressure is reproduced.

* * * * *